United States Patent
McCallum

(10) Patent No.: US 7,680,710 B2
(45) Date of Patent: Mar. 16, 2010

(54) SELF-SERVICE TERMINAL

(75) Inventor: Mark W. J. McCallum, Kirkcaldy (GB)

(73) Assignee: NCR Corporation, Dayton, OH (US)

( * ) Notice: Subject to any disclaimer, the term of this patent is extended or adjusted under 35 U.S.C. 154(b) by 1295 days.

(21) Appl. No.: 10/252,771

(22) Filed: Sep. 23, 2002

(65) Prior Publication Data

US 2003/0074316 A1 Apr. 17, 2003

(30) Foreign Application Priority Data

Oct. 12, 2001 (GB) ................................ 0124641.2

(51) Int. Cl.
*G06Q 40/00* (2006.01)
(52) U.S. Cl. ................................ 705/35; 705/40; 705/43
(58) Field of Classification Search ................ 705/52, 705/53, 56, 77, 16, 35, 41, 43, 402, 40; 902/8, 902/11, 22
See application file for complete search history.

(56) References Cited

U.S. PATENT DOCUMENTS

| | | | | |
|---|---|---|---|---|
| 4,326,254 A | * | 4/1982 | Uchimura et al. | 705/402 |
| 4,349,891 A | * | 9/1982 | Uchimura et al. | 705/402 |
| 4,351,033 A | * | 9/1982 | Uchimura et al. | 705/402 |
| 5,293,310 A | * | 3/1994 | Carroll et al. | 705/14 |
| 5,337,246 A | * | 8/1994 | Carroll et al. | 705/402 |
| 5,444,630 A | * | 8/1995 | Dlugos | 705/402 |
| 6,109,522 A | * | 8/2000 | Force et al. | 235/379 |
| 6,607,124 B1 | * | 8/2003 | Junkins et al. | 235/379 |
| 2002/0032656 A1 | * | 3/2002 | Chen | 705/43 |
| 2003/0217005 A1 | * | 11/2003 | Drummond et al. | 705/43 |
| 2004/0215566 A1 | * | 10/2004 | Meurer | 705/43 |

FOREIGN PATENT DOCUMENTS

| | | |
|---|---|---|
| GB | 2 356 480 | 5/2001 |
| WO | WO 01/22371 A1 | 3/2001 |
| WO | WO 01/57617 A2 | 8/2001 |
| WO | WO 01/67365 A1 | 9/2001 |

OTHER PUBLICATIONS

U.S. Appl. No. 60/193,800.*
A consultant proposes prime-time ATM pricing Anonymous. Bank Network News. Chicago: Jul. 8, 1998. vol. 17, Iss. 4; p. 2, 1 pgs.*
Charges at ATMs as Link buckles; [Foreign Edition] Clare Francis. The Independent. London (UK): Feb 27, 2000. p. 2.*

* cited by examiner

*Primary Examiner*—Lalita M Hamilton
(74) *Attorney, Agent, or Firm*—Charles Q. Maney; Michael Chan

(57) ABSTRACT

A self-service terminal (10) having a user interface (14) and a surcharge application (54) for levying a surcharge on transactions is described. The terminal may be an ATM. The surcharge application (54) is operable to vary the rate of surcharge applied according to a predetermined criterion. The predetermined criterion may be based on the time at which a transaction is executed at the terminal, or upon the usage of the terminal prior to executing a transaction.

9 Claims, 4 Drawing Sheets

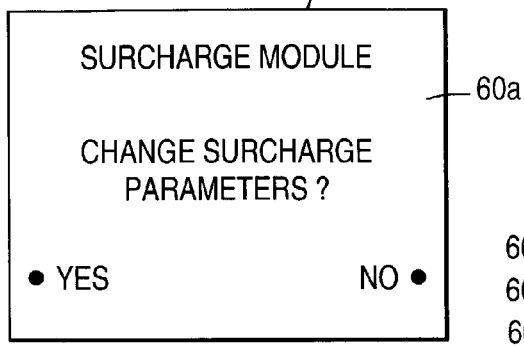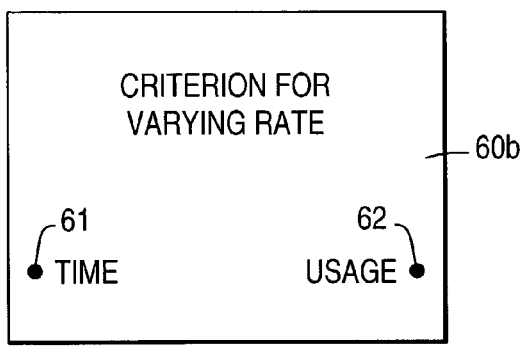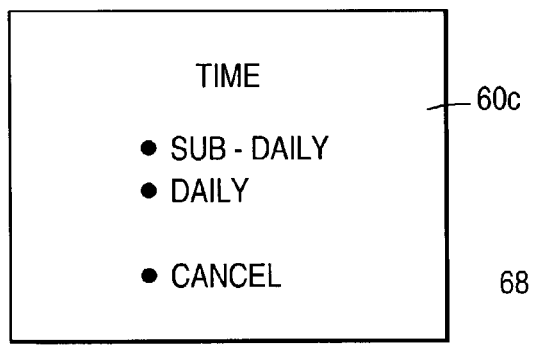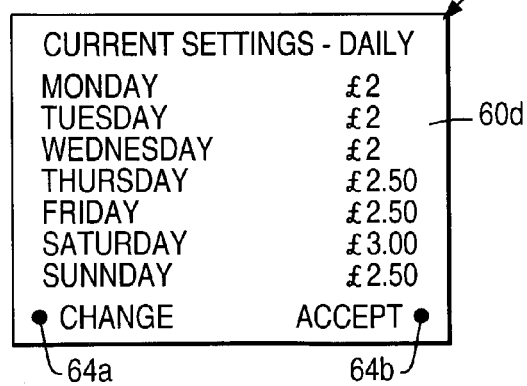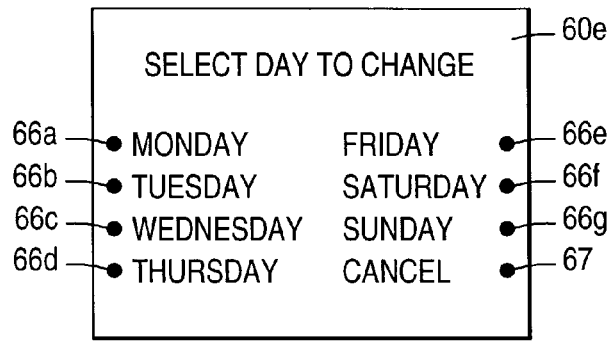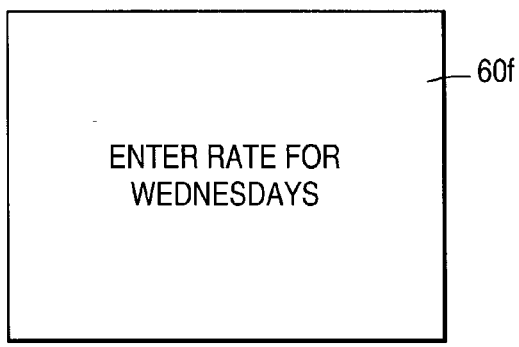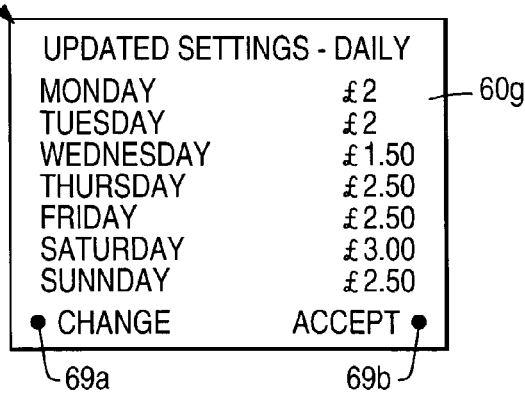

FIG. 3H

PLEASE ENTER
MINIMUM SURCHARGE — 60h

FIG. 3I

PLEASE ENTER
MAXIMUM SURCHARGE — 60i

FIG. 3J

PLEASE ENTER
RATE STEP — 60j

FIG. 3K

USAGE

INCREMENT IF MORE
THAN X TRANSACTIONS
IN Y MINUTES

ENTER X — 60k

FIG. 3L

INCREMENT IF MORE
THAN 5 TRANSACTIONS
IN Y MINUTES

ENTER Y — 60l

FIG. 3M

DECREMENT IF FEWER
THAN Z TRANSACTIONS
IN A MINUTES

ENTER Z — 60m

FIG. 3N

DECREMENT IF FEWER
THAN 3 TRANSACTIONS
IN A MINUTES

ENTER A — 60n

FIG. 3O

UPDATED SETTINGS - USAGE

INCREMENT IF > 5 Tx IN 10 MINS

DECREMENT IF < 3 Tx IN 10 MINS

● CHANGE       ACCEPT ● — 60o

FIG. 4A

PLEASE INSERT
YOUR CARD

FIG. 4B

PLEASE ENTER
YOUR PIN

FIG. 4C

PLEASE SELECT A
TRANSACTION

- CASH
- BALANCE ENQUIRY
- CANCEL

FIG. 4D

PLEASE SELECT AN AMOUNT

THE SURCHARGE FOR
THIS TRANSACTION IS
£1.50
DO YOU WISH TO PROCEED ?
ENTER Z

- YES          NO -

FIG. 4F

PLEASE REMOVE
YOUR CARD

FIG. 4G

PLEASE REMOVE
YOUR CASH

SELF-SERVICE TERMINAL

BACKGROUND OF THE INVENTION

The present invention relates to improvements in or relating to a self-service terminal (SST), such as an automated teller machine (ATM).

ATMs are public access terminals that provide users with a convenient source of cash and other financial transactions and services. With the advent of surcharging (that is, levying a charge on each cash withdrawal transaction at an ATM for the use of the ATM), ATMs are now installed in retail outlets to provide a revenue stream for the owners of the retail outlets. Typically, a retailer receives a percentage of each surcharge levied on a transaction. In another business model the owner of the ATM (the deployer) receives the entire surcharge.

For a retailer to profit from an ATM, the ATM must perform, on average, a certain number of transactions each day. Once this number has been exceeded, the income from each surcharge represents a profit for the retailer. To maximize the profitability of such an ATM, it is desirable to stimulate as many transactions as possible.

SUMMARY OF THE INVENTION

According to a first aspect of the present invention there is provided a self-service terminal having a user interface and a surcharge application for levying a surcharge on transactions, characterized in that the surcharge application is operable to vary the rate of surcharge applied.

Preferably, the surcharge application varies the rate of surcharge applied according to a predetermined criterion. This predetermined criterion may be the time at which a transaction is conducted, the number of transactions being conducted within a time period, the amount of media (for example, banknotes) remaining in the terminal, or such like. The word "time" is used herein to include: hours or parts thereof (for example, half hour periods), days or parts thereof (for example, forenoon and afternoon), weeks, months, and such like.

Preferably, the surcharge application provides maximum and minimum rates of surcharge to allow an owner and/or operator (for example, a retailer) to determine the range within which the surcharge will be varied. The surcharge application may also allow an operator to select an amount by which the rate is incremented or decremented (for example, fifty pence). In most embodiments, it is envisaged that the maximum and minimum rates are both non-zero.

In one embodiment, the terminal is an ATM and the surcharge application is operable to increase the surcharge rate (for example, from one pound sterling to one pound and fifty pence) when the number of transactions in a time period (for example, ten minutes) exceeds five, and to lower the surcharge rate when the number of transactions in a time period (for example, ten minutes) is less than three. Thus, the surcharge rate is automatically increased when there is a high demand for transactions, thereby increasing revenue for the owner of the ATM.

In another embodiment, the terminal is an ATM and the surcharge application is operable to decrease the surcharge rate (for example, from one pound and fifty pence to one pound) when the number of transactions in a time period (for example, ten minutes) exceeds five, and to increase the surcharge rate to the original value when the number of transactions in a time period (for example, ten minutes) is less than three. Thus, the surcharge rate is automatically decreased when there is a high demand for transactions, thereby increasing customer loyalty for the owner of the ATM, and encouraging users to return to that ATM for conducting future transactions.

In other embodiments, the surcharge application may automatically vary the rate of surcharge applied depending on the time of day at which a transaction is conducted. For example, evening transactions may attract a higher surcharge than morning transactions.

The increase in surcharge may be timed to coincide with a special offer in a retail outlet, so that extra revenue from surcharging may offset decreased profit from an item reduced in the special offer. For example, where the retail outlet is a bar, an ATM within the bar may increase the surcharge rate during a "happy hour" (a time period during which drinks are sold at a lower price than normal). The timing of an increase in surcharge rate may also coincide with a major influx of persons into the surrounding area, for example, two hours before and after a major football match.

It will be appreciated that the term retail outlet is intended to include shops, bars, night-clubs, restaurants, casinos, and such like.

Typically, the terminal informs a user about the amount of surcharge that will be levied prior to the user completing a transaction. This is achieved by presenting the user with a screen indicating the surcharge amount that will be applied and requesting the user to confirm that he/she wishes to continue with the transaction. The ATM may also have a notice indicating that a surcharge is levied at the ATM.

By virtue of this aspect of the invention, a self-service terminal automatically varies the rate of surcharge levied based on a predetermined criterion.

The term "screen" is used herein to denote the graphics, text, controls (such as menu options), and such like, that are presented on a display unit; the term "screen" as used herein does not refer to the hardware (for example, the LCD, CRT, or touchscreen) that displays the graphics, text, controls, and such like. Typically, when a transaction is being entered at an SST, a series of screens are presented in succession on the SST display, with the next screen displayed being dependent on a user entry relating to the current screen. For example, a first screen may request a user to insert a card; once a card has been inserted, a second screen may invite the user to enter his/her PIN; once the final digit of the PIN has been entered, a third screen may invite the user to select a transaction; and so on.

According to a second aspect of the present invention there is provided a method of levying a surcharge on a transaction at a self-service terminal, the method comprising the steps of: analyzing the number of transactions executed in a recent time period, comparing this number with a predetermined criterion, and setting a surcharge rate accordingly.

BRIEF DESCRIPTION OF THE DRAWINGS

These and other aspects of the present invention will be apparent from the following specific description, given by way of example, with reference to the accompanying drawings, in which:

FIGS. 3A to 3O illustrate a sequence of screens displayed on the terminal of FIG. 1 while a retailer is programming surcharge parameters; and FIGS. 4A to 4G illustrate a sequence of screens presented to a user of the terminal of FIG. 1 during a transaction at one time.

DETAILED DESCRIPTION

Figure 1:
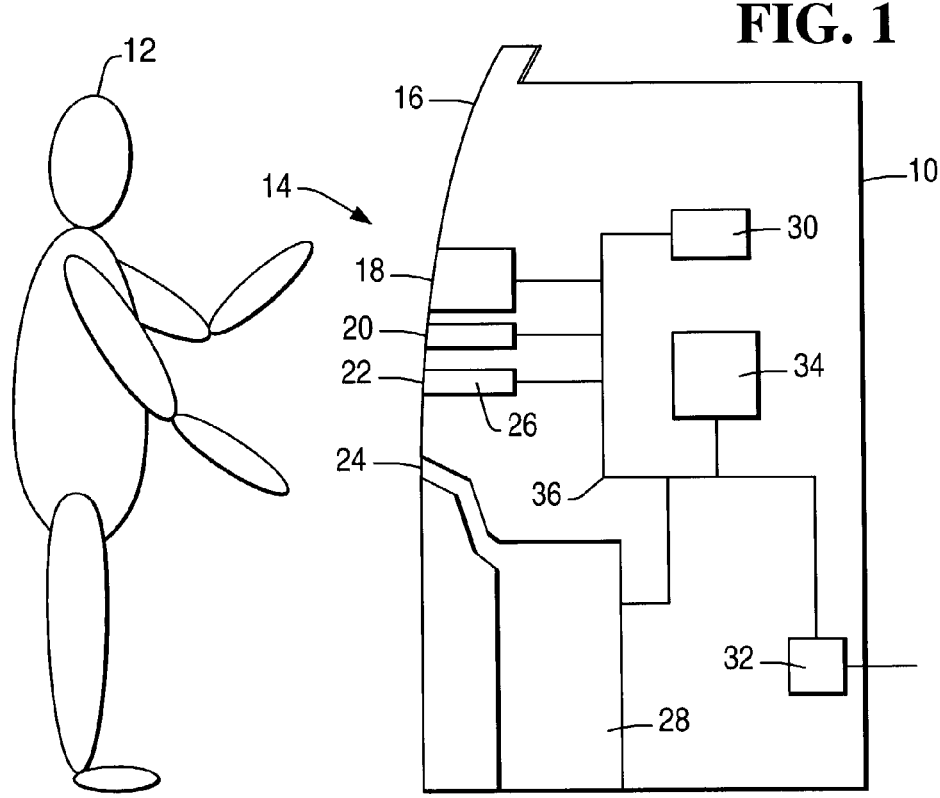
FIG. 1 is a schematic diagram of a self-service terminal according to one embodiment of the present invention.

Reference is now made to FIG. 1, which illustrates an SST 10 (in the form of an ATM) according to one embodiment of the present invention, being operated by a user 12 who is executing a transaction.

The ATM 10 includes a user interface 14 for outputting information to the user 12 and for allowing the user 12 to input information to the ATM 10.

The user interface 14 is a pivotably mounted molded fascia 16 incorporating a display module 18, an encrypting keypad module 20, a card slot 22, and a cash delivery slot 24. The card slot 22 aligns with a motorized card reader module 26, and the cash delivery slot 24 aligns with a cash dispense module 28.

The ATM 10 also includes an internal journal printer module 30 for recording all transactions executed by the ATM 10, a dial-up modem 32 for communicating with a remote transaction host (not shown) that authorizes transactions, and an ATM controller module 34 for controlling the operation of the modules (18,20,26,28,30,32) within the ATM 10. An internal bus 36 for securely conveying data interconnects all of the modules within the ATM 10.

Figure 2:
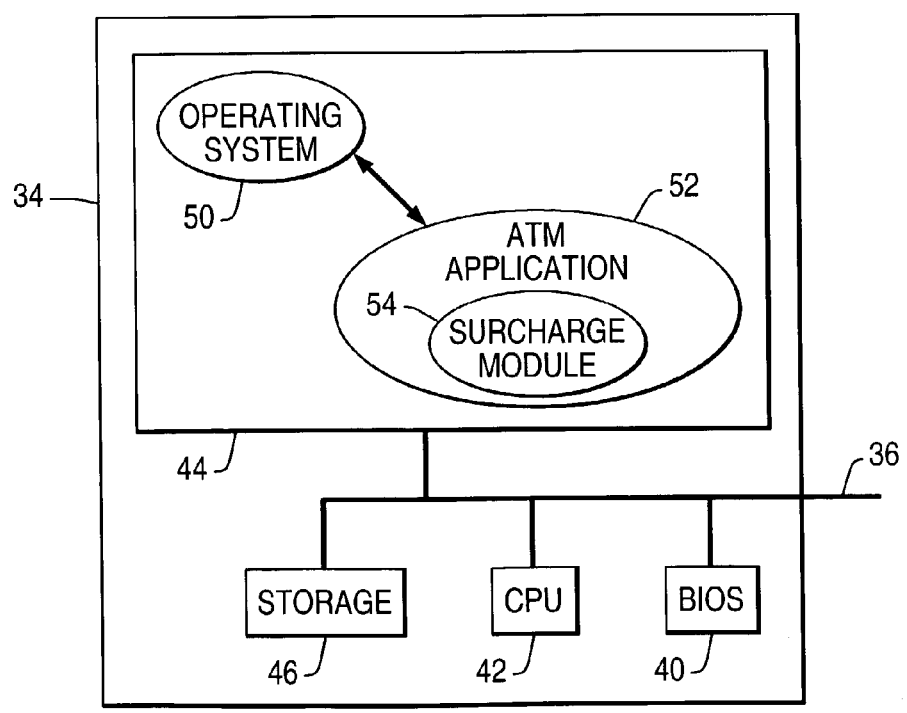
FIG. 2 is a block diagram of a part (the controller) of the terminal of FIG. 1.

The ATM controller 34 is illustrated in more detail in FIG. 2, and comprises a BIOS 40 stored in non-volatile memory, a microprocessor 42 and associated main memory 44, and storage space 46 in the form of a magnetic disk drive.

In use, the microprocessor 42 loads an operating system kernel 50 and control means 52 (in the form of an ATM application program) into the main memory 44. The ATM application 52 includes a surcharge module 54.

The ATM application program 52 controls the operation of the ATM 10. In particular, the ATM application program 52: provides the sequence of screens used in each transaction (referred to as the application flow); monitors the condition of each module within the ATM 10 (referred to as state of health monitoring); monitors the number of transactions executed by the ATM; and executes the surcharge module 54 when required.

The surcharge module 54, when executing, allows an ATM owner or operator (who may lease the ATM) to enter surcharge information by allowing the owner or operator to:

(1.) select a maximum and minimum rate of surcharge,
(2.) determine the increment by which the surcharge will be varied, and
(3.) determine the criterion for incrementing or decrementing the rate of surcharge.

Once this surcharge information has been entered by an ATM owner or operator, the surcharge module 54 conveys the surcharge information to the ATM application program 52 for use in varying the rate of surcharge applied to transactions. The ATM application program 52 stores this conveyed surcharge information on the magnetic disk 46.

To set the surcharge information, a retailer accesses the surcharge module 54 by entering a password while the ATM 10 is in a supervisor mode. The surcharge module 54 provides the retailer with a sequence of screens through which the retailer navigates to enter a criterion for varying the ATM's surcharge rate, as illustrated in FIGS. 3A to 3O.

The surcharge module 54 presents a screen 60a asking the operator if he/she wishes to change the surcharge parameters. If the retailer selects the "NO" option then the surcharge module 54 exits and returns control to the ATM application 52. If the retailer selects "YES" then the surcharge module 54 presents the retailer with a criterion selection screen 60b.

The criterion selection screen 60b (FIG. 3B) prompts the retailer to select whether the surcharge levied should be varied according to the time at which a transaction is conducted (option 61) or according to how frequently the ATM is being used (option 62).

If the retailer selects the time option 61 then the surcharge module 54 presents a time selection screen 60c (FIG. 3C) listing two different cycles that can be chosen: sub-daily (which may be divided into hours or groups of hours) and daily. In this example, the retailer selects the daily cycle.

The surcharge module 54 then presents a current daily settings screen 60d (FIG. 3D) having a table 63 listing all the days of the week and the surcharge rate applied for each day, and providing a selectable option 64a for changing the current settings and a selectable option 64b for accepting the current settings. In this example, the retailer opts to change the current settings.

The surcharge module 54 then presents the retailer with a day selection screen 60e (FIG. 3E) listing the days in a week as selectable options 66a to 66g, and a cancel option 67. In this example, the retailer desires to change the ATM's surcharge rate on Wednesdays from two pounds to one pound and fifty pence. To achieve this, the retailer selects the Wednesday option 66c.

The surcharge module 54 then presents the retailer with a surcharge rate selection screen 60f (FIG. 3F) for Wednesdays. The retailer enters the value in pence; in this example, one hundred and fifty pence.

The surcharge module 54 then presents the retailer with an updated current settings screen 60g (FIG. 3G) having an updated weekly settings table 68 showing the current settings for a week, and providing a selectable option 69a for changing the current settings and selectable option 69b for accepting the current settings. As the retailer has now changed the settings, the retailer opts to accept the current settings. The surcharge module 54 stores these settings on the magnetic disk 46.

If, while viewing the criterion selection screen 60b (FIG. 3B), the retailer selects the usage option 62, then the surcharge module 54 presents the retailer with a minimum surcharge screen 60h (FIG. 3H) requesting the retailer to enter the lowest level of surcharge to be applied.

Once the retailer enters a value (for example, one hundred pence), the surcharge module 54 presents the retailer with a maximum surcharge screen 60i (FIG. 3I) requesting the retailer to enter the highest level of surcharge to be applied.

Once the retailer enters a value (for example, two hundred and fifty pence), the surcharge module 54 presents the retailer with a step amount screen 60j (FIG. 3J) requesting the retailer to enter an amount by which the surcharge will be incremented or decremented if a predetermined criterion is met.

Once the retailer enters a value (for example, fifty pence), the surcharge module 54 presents a series of four screens (60k to 60n) to determine the rate at which transactions have to be executed before the ATM 10 increments the surcharge, and the rate to which the number of transactions must fall before the ATM decrements the surcharge.

Screen 60k (FIG. 3K) requests the retailer to enter the number of transactions required for the surcharge rate to be incremented. In this example, the retailer enters the number five.

Screen 60l (FIG. 3L) then requests the retailer to enter the time period during which more than five transactions must be executed before the surcharge rate is to be incremented. In this example, the retailer enters the number ten so that six transactions are required within a ten minute period before the surcharge is incremented (provided the surcharge is not at the limit specified in the maximum surcharge screen 60*i*).

Similarly, screens 60*m* (FIG. 3M) and 60*n* (FIG. 3N) enable the retailer to instruct the ATM 10 that if fewer than three transactions are executed within a ten minute period then the surcharge is decremented (provided the surcharge is not at the limit specified in the minimum surcharge screen 60*h*).

The surcharge module 54 then presents the retailer with a usage criterion screen 60*o* (FIG. 3O) summarizing the criterion for incrementing and decrementing the surcharge to be applied to a transaction. If the retailer does not accept this summary, then the surcharge module 54 presents the user with the initial surcharge screen 60*a* (FIG. 3A). If the retailer accepts this summary then the surcharge module 54 stores this information on the magnetic disk 46 (FIG. 2) and returns control to the ATM application 52.

The last criterion that was updated is used as the criterion for varying the surcharge rate at the ATM 10. Thus, if the time option (screen sequence 60*c* to 60*g*) was last updated then the surcharge levied is determined by the time at which the ATM 10 is used in combination with the stored table indicating the rate for that time; whereas, if the usage option (screen sequence 60*h* to 60*o*) was last updated then the surcharge levied is determined by recent usage of the ATM 10 in combination with the stored criterion for number of transactions within a time period.

An example of a typical transaction at the ATM 10 will now be described with reference to FIGS. 4A to 4G, which illustrate the sequence of screens presented to the user 12 when the ATM 10 varies the surcharge according to the time at which the ATM 10 is used. In this example, a transaction is executed on a Wednesday, for which the surcharge is one pound and fifty pence (from table 68 on FIG. 3G).

When the user 12 approaches the ATM 10 he/she is presented with an attract screen 70*a* (FIG. 4A) on display 18 inviting him/her to insert a card.

After inserting a card, the user 12 is presented with a screen 70*b* (FIG. 4B) inviting him/her to enter a personal identification number (PIN).

The ATM application program 52 then presents the user 12 with a screen 70*c* (FIG. 4C) listing transaction options available.

After the user 12 has selected the withdraw cash option, the ATM application 52 presents the user with a screen 70*d* (FIG. 4D) indicating cash amounts available.

Once the user has selected a cash amount, the ATM application 52 presents a screen 70*e* informing the user of the surcharge that will be levied, in this example one pound and fifty pence. The surcharge rate is retrieved from the weekly settings table 68 that was stored on the disk drive 46 when it was input by the retailer at screen 60*f*. Surcharge screen 70*e* also provides a selectable option 72 for accepting the surcharge, and a selectable option 74 for canceling the transaction.

If the user 12 selects the option 74 for canceling the transaction then the user's card is returned and the ATM application 52 reverts to the attract screen 70*a*.

If the user 12 selects the accept option 72 then the ATM application 52 authorizes the transaction (for the amount of money requested plus the surcharge) and then presents a screen 70*f* (FIG. 4F) inviting the user to remove his/her card.

Once the user has removed his/her card, the ATM application 52 presents a screen 70*g* (FIG. 4G) inviting the user to remove the requested cash.

Once the cash has been removed, the ATM application 52 reverts to the attract screen 70*a*.

If the above transaction had been performed on a Friday, then the ATM would have levied a surcharge of two pounds and fifty pence based on the information contained in the weekly settings table 68 (FIG. 3G).

If the retailer had set the ATM 10 to surcharge according to usage, and the usage settings were:
  minimum surcharge equals one pound,
  maximum surcharge equals two pounds,
  step equals fifty pence, and
  transaction criterion equals that shown in screen 60*o* (FIG. 3O);

and the above transaction had been performed on a Wednesday, two hours after the last transaction, then the surcharge applied would have been one pound (the minimum value). If the usage settings were those given above, and the transaction was performed after thirty transactions had been performed equally spaced in a half-hour period, then the surcharge applied would have been two pounds (the maximum value).

Various modifications may be made to the above described embodiment within the scope of the invention, for example, other criteria may be used for varying the surcharge rate than those given above. In other usage-based embodiments, the decrement amount may differ from the increment amount.

What is claimed is:

1. An automated teller machine (ATM) comprising:
  a cash dispenser for dispensing cash to an ATM customer conducting a cash dispense transaction; and
  a controller for (i) controlling the cash dispenser to dispense cash to the ATM customer while the ATM customer is conducting the cash dispense transaction, and (ii) levying a variable rate surcharge on the cash dispense transaction conducted by the ATM customer based upon frequency of use of the ATM prior to when the cash dispense transaction is conducted.

2. An ATM according to claim 1 wherein the variable rate surcharge is increased with increasing frequency of use of the ATM prior to when the cash dispense transaction is conducted.

3. An ATM according to claim 1 wherein the variable rate surcharge is decreased with increasing frequency of use of the ATM prior to when the cash dispense transaction is conducted.

4. A method of operating an automated teller machine (ATM) during a cash dispense transaction conducted by an ATM customer at the ATM, the method comprising the step of:
  levying a variable rate surcharge on the cash dispense transaction being conducted at the ATM based upon frequency of use of the ATM prior to when the cash dispense transaction is being conducted by the ATM customer at the ATM.

5. A method of operating an automated teller machine (ATM) during a cash dispense transaction conducted by an ATM customer at the ATM, the method comprising the steps of:
  receiving a request from the ATM customer for an amount of cash to be dispensed;
  authorizing the cash dispense transaction for the requested amount of cash plus a first surcharge amount if the amount of cash remaining in the ATM is a first cash amount;
  authorizing the cash dispense transaction for the requested amount of cash plus a second surcharge amount which is different from the first surcharge amount if the amount of cash remaining in the ATM is a second cash amount which is different from the first cash amount; and dispensing the requested amount of cash to the ATM customer.

6. A method of operating an automated teller machine (ATM) during a cash dispense transaction conducted by an ATM customer at the ATM, the method comprising the step of:

levying a variable rate surcharge on the cash dispense transaction conducted by the ATM customer based solely upon a point in time at which the cash dispense transaction is conducted.

7. A method according to claim 6 wherein the point in time at which the cash dispense transaction is conducted comprises a time of day at which the cash dispense transaction is conducted.

8. A method according to claim 6 wherein the point in time at which the cash dispense transaction is conducted comprises a day of the week on which the cash dispense transaction is conducted.

9. A method according to claim 6 wherein the point in time at which the cash dispense transaction is conducted comprises a month of the year in which the cash dispense transaction is conducted.

* * * * *